(12) United States Patent
Chao et al.

(10) Patent No.: US 8,856,656 B2
(45) Date of Patent: Oct. 7, 2014

(54) SYSTEMS AND METHODS FOR CUSTOMIZING PHOTO PRESENTATIONS

(75) Inventors: Chen-Yu Chao, Shulin (TW); Shih-Hsien Yeh, Shinjuang (TW)

(73) Assignee: Cyberlink Corp., Shindian, Taipei (TW)

( * ) Notice: Subject to any disclaimer, the term of this patent is extended or adjusted under 35 U.S.C. 154(b) by 623 days.

(21) Appl. No.: 12/725,591

(22) Filed: Mar. 17, 2010

(65) Prior Publication Data

US 2011/0231766 A1   Sep. 22, 2011

(51) Int. Cl.
*G06F 3/00*       (2006.01)
*G06F 3/0481*   (2013.01)
*H04N 1/387*    (2006.01)
*G06F 3/01*       (2006.01)

(52) U.S. Cl.
CPC ............. *H04N 1/387* (2013.01); *G06F 3/0481* (2013.01)
USPC ........... 715/732; 715/716; 715/719; 715/723; 715/730; 715/731

(58) Field of Classification Search
USPC .......... 715/716, 719, 723, 730, 731, 732, 863
See application file for complete search history.

(56) References Cited

U.S. PATENT DOCUMENTS

| | | | | |
|---|---|---|---|---|
| 7,505,051 | B2* | 3/2009 | Wang | 345/660 |
| 7,574,101 | B2* | 8/2009 | Gohara et al. | 386/278 |
| 2001/0055414 | A1* | 12/2001 | Thieme | 382/135 |
| 2005/0192924 | A1* | 9/2005 | Drucker et al. | 707/1 |
| 2005/0238322 | A1* | 10/2005 | Gohara et al. | 386/52 |
| 2010/0185949 | A1* | 7/2010 | Jaeger | 715/730 |
| 2010/0277618 | A1* | 11/2010 | Hiratsuka | 348/239 |
| 2010/0289913 | A1* | 11/2010 | Fujiwara | 348/222.1 |
| 2011/0050915 | A1* | 3/2011 | Wang et al. | 348/207.99 |
| 2011/0115937 | A1* | 5/2011 | Sassa | 348/222.1 |
| 2011/0176720 | A1* | 7/2011 | Van Osten et al. | 382/154 |
| 2011/0200980 | A1* | 8/2011 | Takahashi et al. | 434/365 |
| 2011/0273471 | A1* | 11/2011 | Nagasaka et al. | 345/619 |

* cited by examiner

*Primary Examiner* — Nicholas Augustine
(74) *Attorney, Agent, or Firm* — McClure, Qualey & Rodack, LLP

(57) ABSTRACT

Various systems and methods are described for customizing photo presentations. One particular method comprises receiving by the media display system, a plurality of photos depicting individuals and displaying one or more controls for specifying an action to one or more selected individuals. The method further comprises receiving a selection of one or more individuals, generating an action list according to the selection, and customizing the photo presentation comprising photos from among the received plurality of photos according to the action list and according to the analyzed facial regions.

19 Claims, 15 Drawing Sheets

SYSTEMS AND METHODS FOR CUSTOMIZING PHOTO PRESENTATIONS

TECHNICAL FIELD

The present disclosure generally relates to electronic photo management and more particularly relates to systems and methods for customizing photo presentations.

BACKGROUND

With the widespread use of digital cameras, many individuals turn to image management tools to archive and organize their digital photographs. Image management tools found on the market offer various features, including automatic image organization. Archived images may be used to generate photo presentations such as slideshows for others to view. Image management tools may be used to search for a particular individual's photos within a collection of photographs. This may be useful, for example, when a user wants to identify all photos of a particular individual so that the user can customize a slideshow. Challenges may arise, however, when trying to organize and search through a large volume of photos. While manually organizing photos is an alternative, this approach can be tedious and time-consuming.

SUMMARY

Briefly described, one embodiment, among others, is a media display system for customizing a photo presentation. The system comprises a media manager configured to receive the plurality of images, a media editor configured to analyze the plurality of images. The media editor comprises a user interface generator for displaying on an image and one or more controls for specifying an action and for selecting one or more individuals in the image. The media editor is configured to generate an action list according to the specified action and the selection of one or more individuals, wherein the media manager is further configured to customize the photo presentation according to the action list.

Another embodiment is a computer-readable medium storing a program for execution on a processor, the program comprising computer executable instructions configured to perform the steps of receiving a plurality of slides depicting individuals for a slideshow, generating a user interface comprising controls displayed on a current slide, receiving a selection of one or more individuals and an action via the controls, generating an action list according to the selection and the specified action, performing the specified action to the plurality of slides to obtain a subset of slides based on the analyzed facial regions, and beginning with the next slide, resuming the slideshow based on the subset of slides.

Another embodiment is a method performed in a media display system for customizing a photo presentation. The method comprises receiving by the media display system, a plurality of photos depicting individuals, displaying one or more controls for specifying an action to one or more selected individuals, receiving a selection of one or more individuals, generating an action list according to the selection, and customizing the photo presentation comprising photos from among the received plurality of photos according to the action list and according to the analyzed facial regions.

Other systems and methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 2 illustrates an embodiment of the media display system shown in

FIG. 1.

DETAILED DESCRIPTION

Figure 1:
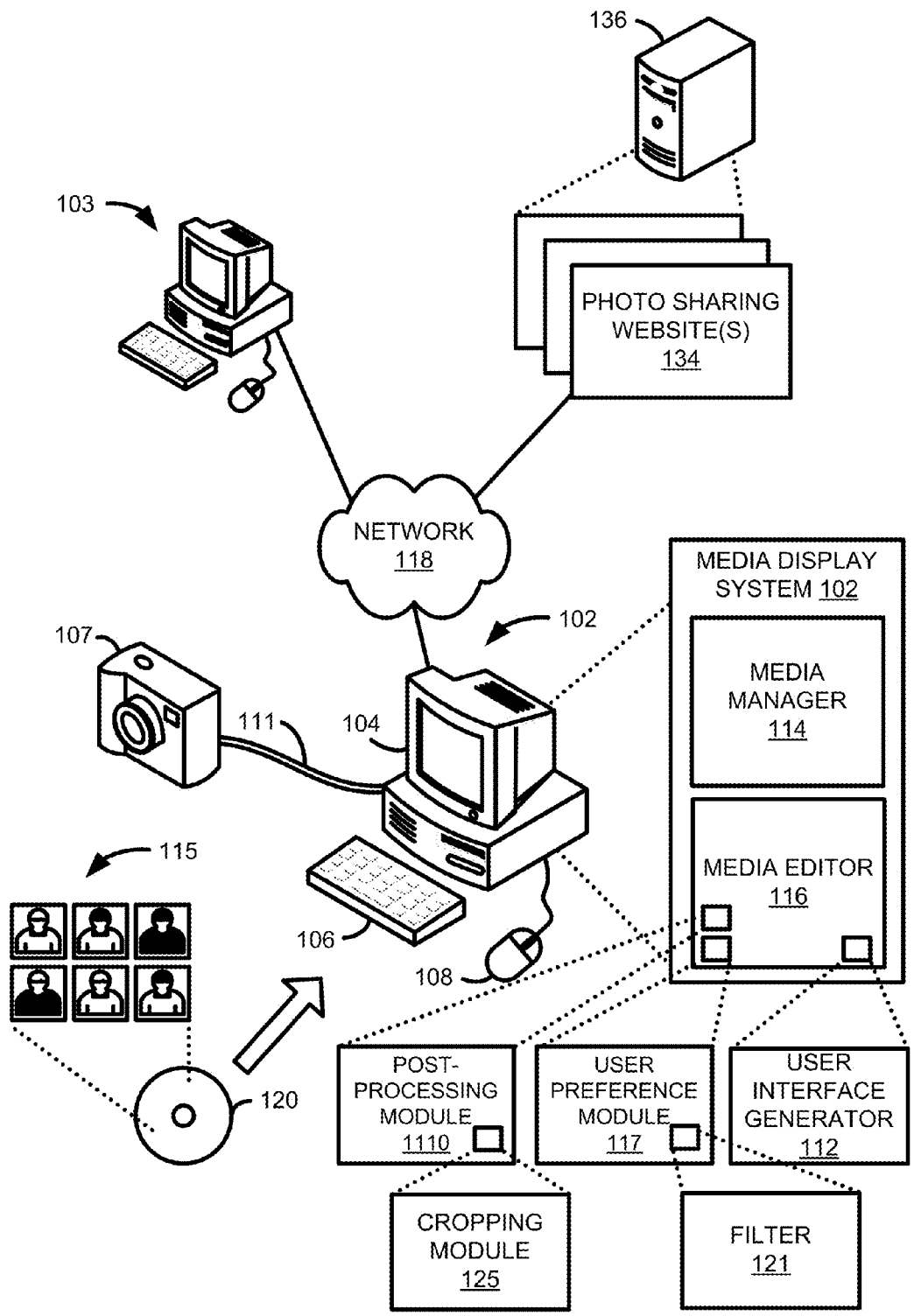
FIG. 1 depicts a top-level diagram of a media display system for selecting individuals to be included or excluded from a photo presentation such as a slideshow.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

As described earlier, challenges may arise when trying to manually organize a large volume of photos, particularly as more photos are added to a photo collection. In some cases, an individual may want to produce a photo presentation in the form of a slideshow that comprises photos based on specific criteria or user preference. For example, an individual may want to produce a slideshow comprising all photos from a collection in which a particular individual is shown. Such photos may comprise photos of the individual by himself and photos of the individual with one or more other individuals. An individual may also decide to produce a slideshow which excludes all photos bearing one or more particular individuals. Such individuals may be assigned to a "dislike list" used to filter all photos bearing these individuals.

The present disclosure generally relates to electronic photo management and more particularly relates to digital picture frame and methods for customizing photo presentations based on such user input as finger gestures. Various embodiments are described that allow an individual to produce customized slideshows through a media display system without the time-consuming process of manually identifying photos to include or exclude. For some embodiments, the individual's selection is incorporated in real-time such that slides that follow the current slide comprise photos selected according to the user-defined preferences.

It should be emphasized that while the various embodiments are described herein with respect to photos of individuals, the embodiments described may also be applied to objects, particular landscapes, etc. The user-defined preferences may also be defined with respect to time, photo quality, and other criteria. For some embodiments, the user-defined preferences may comprise one or more ratings associated with particular individuals, objects, and so on. In accordance with such embodiments, the ratings may be specified based on a graphics control panel, a slider control, a spinner control, or other controller. Based on the assigned rating assigned to each particular individual, the individual is either included or excluded from the presentation. More details regarding the use of ratings are provided later.

Various embodiments are described for excluding or including images and are performed in a media display system. Based on one or more selections made by the user with respect to a current photo, photos may be analyzed and photos bearing identified individuals are included or excluded in a slideshow presentation. Note that the analysis of photos may be performed optionally, and the media display system described may process photos that have already been analyzed. Such analyzed photos may have metadata embedded within the photos that define certain attributes of the photos. It should also be noted that other means for presenting photos other than a slideshow may also be used. For example, the analyzed photos may be presented in the form of thumbnails. The favorites/dislike list provides the selection criteria for including or excluding photos in the slideshow. In this regard, an action list is used to customize a photo presentation, and techniques are described for selecting individuals to be put on the favorites/dislike lists. For some embodiments, the action list may be utilized to organize and/or sort images. The sorting of images may be based on such parameters as picture quality, sharpness, whether individuals in the images are smiling, time information, confidence levels relating to facial matches, and geotagging. Various components of a system in which various embodiments operate are now described followed by a description of the operation of these components.

FIG. 1 depicts a top-level diagram of a media display system 102 for selecting individuals to be included or excluded from a photo presentation such as a slideshow. The system comprises the media display system 102 that may be embodied, for example, as a desktop computer, computer workstation, laptop, or other computing platform. The media display system 102 includes a display 104 and input devices such as a keyboard 106 and a mouse 108. The media display system 102 comprises a media manager 114 and a media editor 116. The media editor 116 comprises a post-processing module 119 configured to zoom in and out of facial regions, a user preference module 117, and a user interface generator 112. For some embodiments, the user preference module 117 further comprises a filter 121. The post-processing module 119 further comprises a cropping module 125. The components above may be embodied in hardware or software, or a combination of both. When embodied in software, the components are implemented as a program stored on a tangible medium such as a computer-readable medium for execution by a processor.

The user interface generator 112 is configured to generate one or more interfaces which allow a user to input one or more selections. In accordance with exemplary embodiments, the user interface generator 112 superimposes one or more controls on a current photo or slide within a slideshow, which then allows a user to interact with the photo or slide. A user begins by viewing a slideshow and invoking the one or more controls when the user decides to customize the slideshow. Customizing a slideshow or photo presentation may comprise altering the contents or make-up of photos from which the slideshow or photo presentation is generated. Customizing may also comprise inserting special effects, as will be described in more detail later. Note that the changes are incorporated in real-time such that the specified changes are immediately incorporated into slides that follow the current photo, where the current photo is the photo in which user input is received for customizing the slideshow or photo presentation. Note also that a plurality of current photos comprises photos that follow the current photo, where the current photo is the photo in which user input is received for customizing the slideshow or photo presentation. Note also that a plurality of current photos comprises photos that follow the current photo.

For some implementations, one or more individuals are selected by a finger motion or mouse click, and a context menu is generated whereby the user can select whether to include or exclude the selected individual. Other implementations will be described in more detail later. The media manager 114 is configured to receive a collection of images 115 comprising one or more individuals and organize the images 115 for further processing by the media editor 116. The media editor 116 performs, among other functions, facial recognition/analysis, post-processing, and generation of one or more user interfaces. For some embodiments, the user preference module 117 identifies and analyzes the facial regions of the images. Note, however, that for such embodiments, the analysis performed by the user preference module 117 is not limited to the facial region and may include other attributes of the image such as the individual's clothing, the background, landscape, and so on. For other embodiments, the user preference module 117 receives user defined settings via the user interface generator 112. Such user defined settings may comprise, for example, the identification of one or more specific individuals within one or more digital images 115. For such embodiments, facial analysis is not required.

The user preference module 117 comprises a filter 121 used to include or exclude photos of particular individuals. For example, upon receiving the instruction at the media display system 102 via a user interface to exclude all photos of "Joe," the filter 121 filters all photos bearing "Joe" from the slideshow based on analysis performed by the user preference module 117. This may be accomplished by either performing facial analysis to identify all instances of "Joe" in photos based on user defined settings whereby photos of "Joe" are manually identified for exclusion or favorites within the photo presentation.

For some implementations, the post-processing module 119 is used to exclude certain individuals by actually removing the individual(s) from a photo. This may comprise using the cropping module 125 to crop the photo according to area(s) bearing individual(s) not to be excluded. A desired rectangular area within the image is defined, and the unwanted portion of the image falling outside the rectangular area is discarded. Referring to the example above where "Joe" is selected to be excluded. The cropping module 125 crops a photo bearing "Joe" and "Susan" such that only "Susan" is left in the photo. As another example, for a photo depicting "Joe," "Susan," and "John," the photo is cropped by cropping module 125 such that only "Susan" and "John" are left. For some embodiments, the cropped areas are merged together.

The media display system 102 in FIG. 1 receives digital images 115 stored on a storage medium such as, for example, a compact disc (CD) 120 or a universal serial bus (USB) flash drive. As one of ordinary skill will appreciate, the digital images 115 may be encoded in any number of formats, including but not limited to, JPEG (Joint Photographic Experts Group) files, TIFF (Tagged Image File Format) files, PNG (Portable Network Graphics) files, GIF (Graphics Interchange Format) files, and BMP (bitmap) files. As depicted in FIG. 1, the media display system 102 may also receive digital images 115 directly from a digital camera 107 via a cable 111 or some other interface. The media display system 102 may support any one of a number of common computer interfaces, such as, but not limited to IEEE-1394 High Performance Serial Bus (Firewire), USB, a serial connection, and a parallel connection.

The digital camera 107 may also be coupled to the media display system 102 over a wireless connection or other communication path. The media display system 102 may also be coupled to a network 118, such as the Internet or a local area network (LAN). Through the network 118, the media display system 102 may receive digital images 115 from another media display system 103. Alternatively, the media display system 102 may also access one or more photo sharing websites 134 hosted on a server 136 via the network 118 to retrieve digital images 115.

Figure 2:
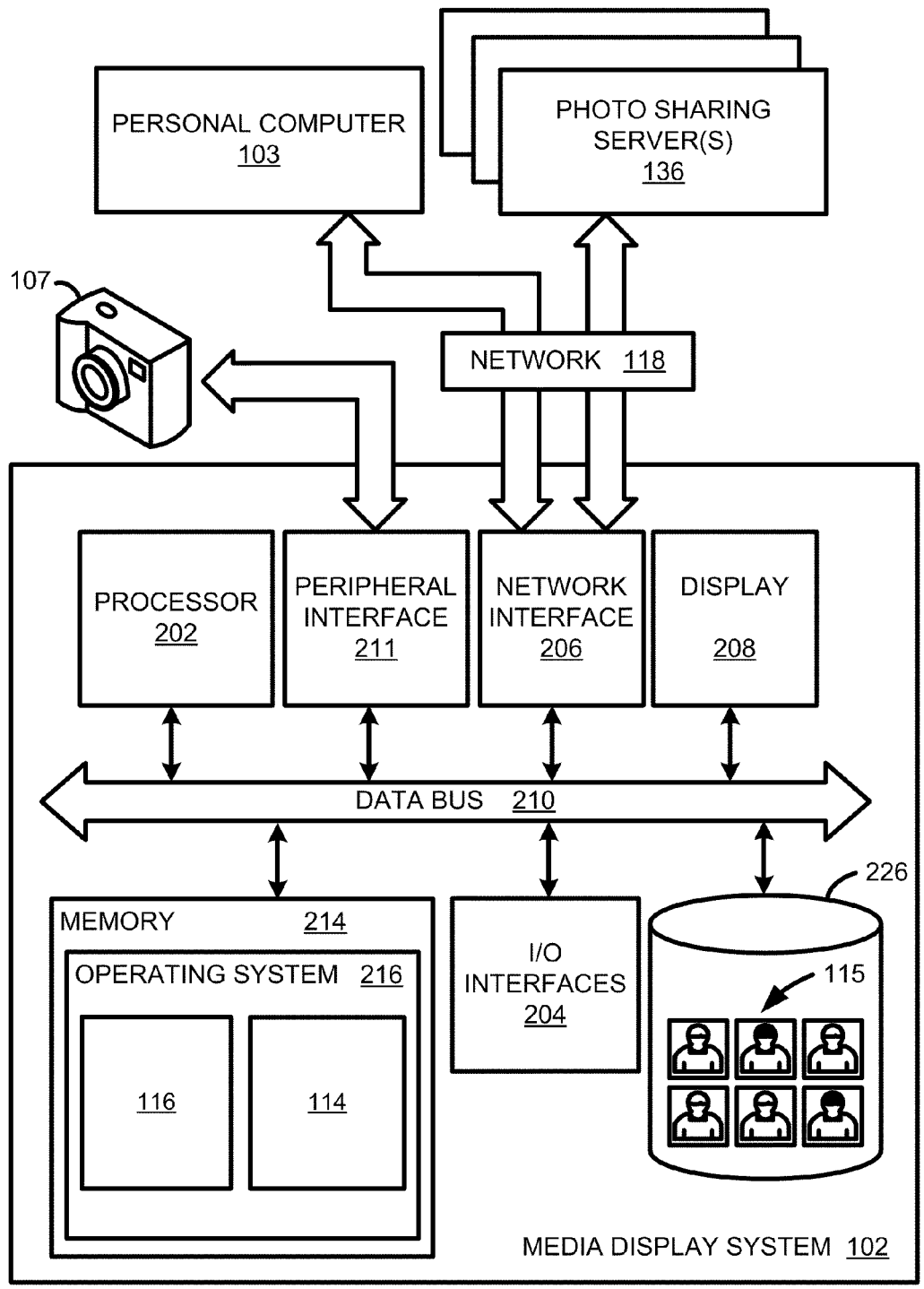

FIG. 2 illustrates an embodiment of the media display system 102 shown in FIG. 1. The media display system 102 may comprise any one of a wide variety of wired and/or wireless computing devices, such as a desktop computer, portable computer, dedicated server computer, multiprocessor computing device, smartphone, personal digital assistant (PDA), digital camera, digital photo frame, and so forth. As shown in FIG. 2, the media display system 102 comprises memory 214, a processing device 202, a number of input/output interfaces 204, a network interface 206, a display 208, a peripheral interface 211, and mass storage 226, wherein each of these devices are connected across a local data bus 210.

The processing device 202 may include any custom made or commercially available processor, a central processing unit (CPU) or an auxiliary processor among several processors associated with the media display system 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software which may comprise the media manager 114 and media editor 116 of FIG. 1. In accordance with such embodiments, these components 114, 116 are stored in memory 214 and executed by the processing device 202. Note that the other components 112, 117, 119, 121, 125 in the media editor of FIG. 1 may also be embodied as application specific software. One of ordinary skill in the art will appreciate that the memory 214 can, and typically will, comprise other components which have been omitted for purposes of brevity.

Input/output interfaces 204 provide any number of interfaces for the input and output of data. For example, where the media display system 102 comprises a personal computer, these components may interface with user input device 204, which may be a keyboard or a mouse, as shown in FIG. 1. Display 208 can comprise a computer monitor or a plasma screen for a PC or a liquid crystal display (LCD) on a hand held device, for example. As will be described in more detail later, a user may enter selections via a user interface rendered on the display 104 using the input/output interfaces 204.

In the context of this disclosure, a computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

With further reference to FIG. 2, network interface device 206 comprises various components used to transmit and/or receive data over a network environment. For example, the network interface 206 may include a device that can communicate with both inputs and outputs, for instance, a modulator/demodulator (e.g., a modem), wireless (e.g., radio frequency (RF)) transceiver, a telephonic interface, a bridge, a router, network card, etc.). As shown in FIG. 2, the media display system 102 may communicate with one or more photo sharing servers 136 or another media display system 103 via the network interface 206 over the network 118. The media display system 102 may further comprise mass storage 226 which stores and manages such data as received digital images 115. The peripheral 211 interface supports various interfaces including, but not limited to IEEE-1394 High Performance Serial Bus (Firewire), USB, a serial connection, and a parallel connection.

Figure 3:
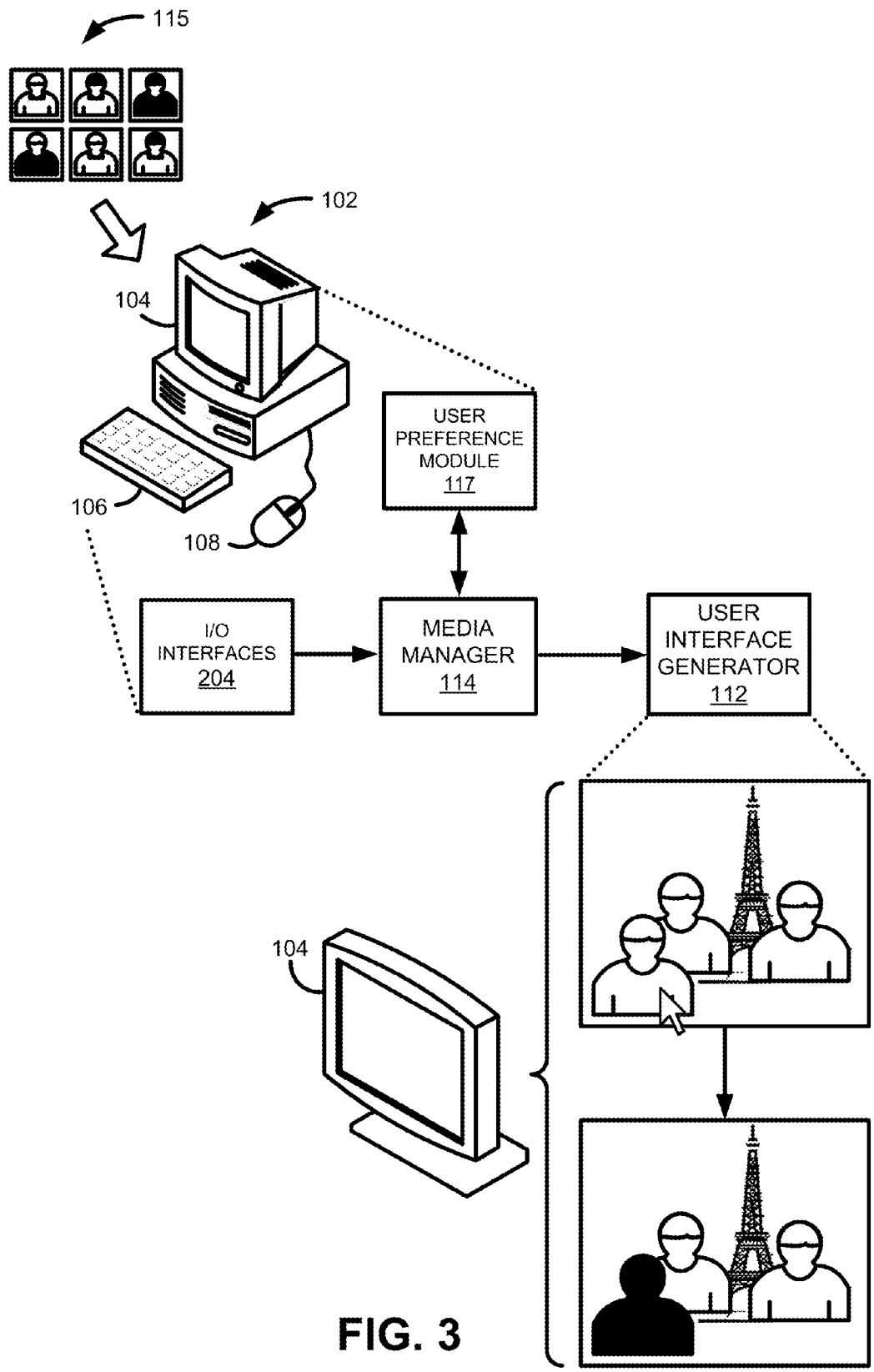
FIG. 3 illustrates the general data flow for an embodiment of the media display system in FIG. 1.

FIG. 3 illustrates the general data flow for an embodiment of the media display system 102 in FIG. 1. As described earlier with reference to FIG. 1, digital images 115 are received at the media display system 102 through various means. For example, this may comprise receiving digital images 115 from a storage medium 120, photo sharing websites 134, and a digital camera 107. The media display system 102 stores the digital images 115 in mass storage 226. The I/O interfaces 204 may be utilized with one or more user interfaces rendered by the user interface generator 112 to receive selections of individuals. The user preference module 117 operates in conjunction with the media manager 114 to include or exclude photos of particular individuals selected via the one or more user interfaces. The slideshow or photo presentation is then output on the display 104.

Figure 4:
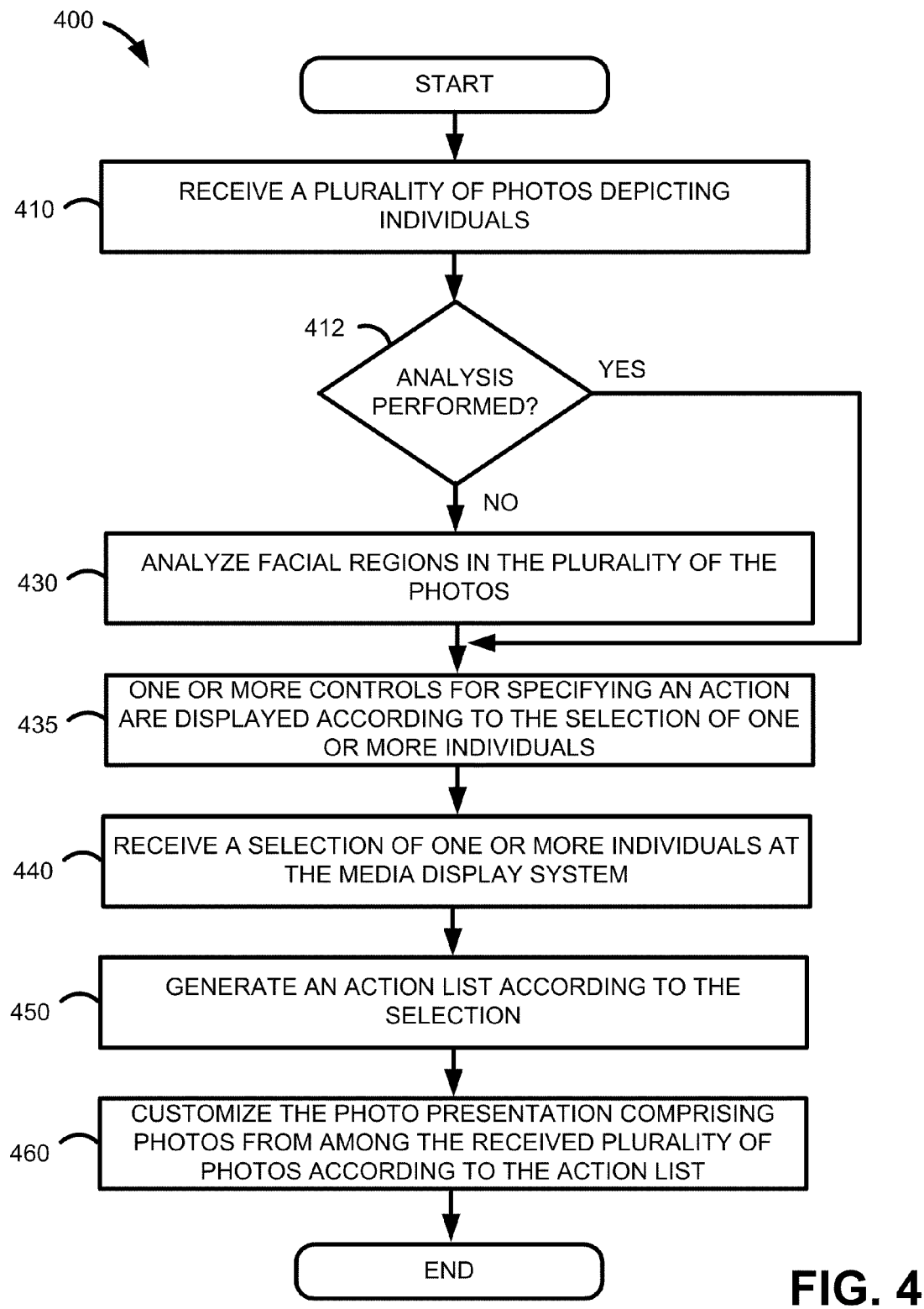
FIG. 4 is a flowchart of an embodiment for customizing a photo presentation using the media display system of FIG. 1.

FIG. 4 is a flowchart 400 of an embodiment for customizing a photo presentation performed in the photo layout system 102 of FIG. 1. It should be noted that if embodied in software, each block may represent a module, segment, or portion of code that comprises program instructions to implement the specified logical function(s). The program instructions may be embodied in the form of source code that comprises statements written in a programming language or machine code that comprises numerical instructions recognizable by a suitable execution system such as a processor in a computer system or other system such as the ones shown in FIG. 1. The machine code may be converted from the source code, etc. If embodied in hardware, each block may represent a circuit or a number of interconnected circuits to implement the specified logical function(s).

One particular embodiment is a method performed in a media display system 102 for customizing a photo presentation. Block 410 begins by receiving a plurality of photos depicting individuals. In decision block 412, if the plurality of the photos has already been analyzed, then the method proceeds to block 435, where one or more controls for specifying an action are displayed according to the selection of one or more individuals. Note that for some implementations, the photos which have already been analyzed may have corresponding metadata that characterizes the photos. For some embodiments, if the plurality of photos has not been analyzed, then the method proceeds to block 430, where facial regions in the plurality of photos are analyzed. In block 440, a selection of one or more individuals is received at the media display system 102. Block 450 continues by generating an action list according to the selection. In block 460, the photo presentation comprising photos from among the received plurality of photos is customized according to the action list. As one of ordinary skill in the art will appreciate, other sequences of steps may be possible, and the particular order of steps set forth above should not be construed as limitations on the claims.

Figure 5A:
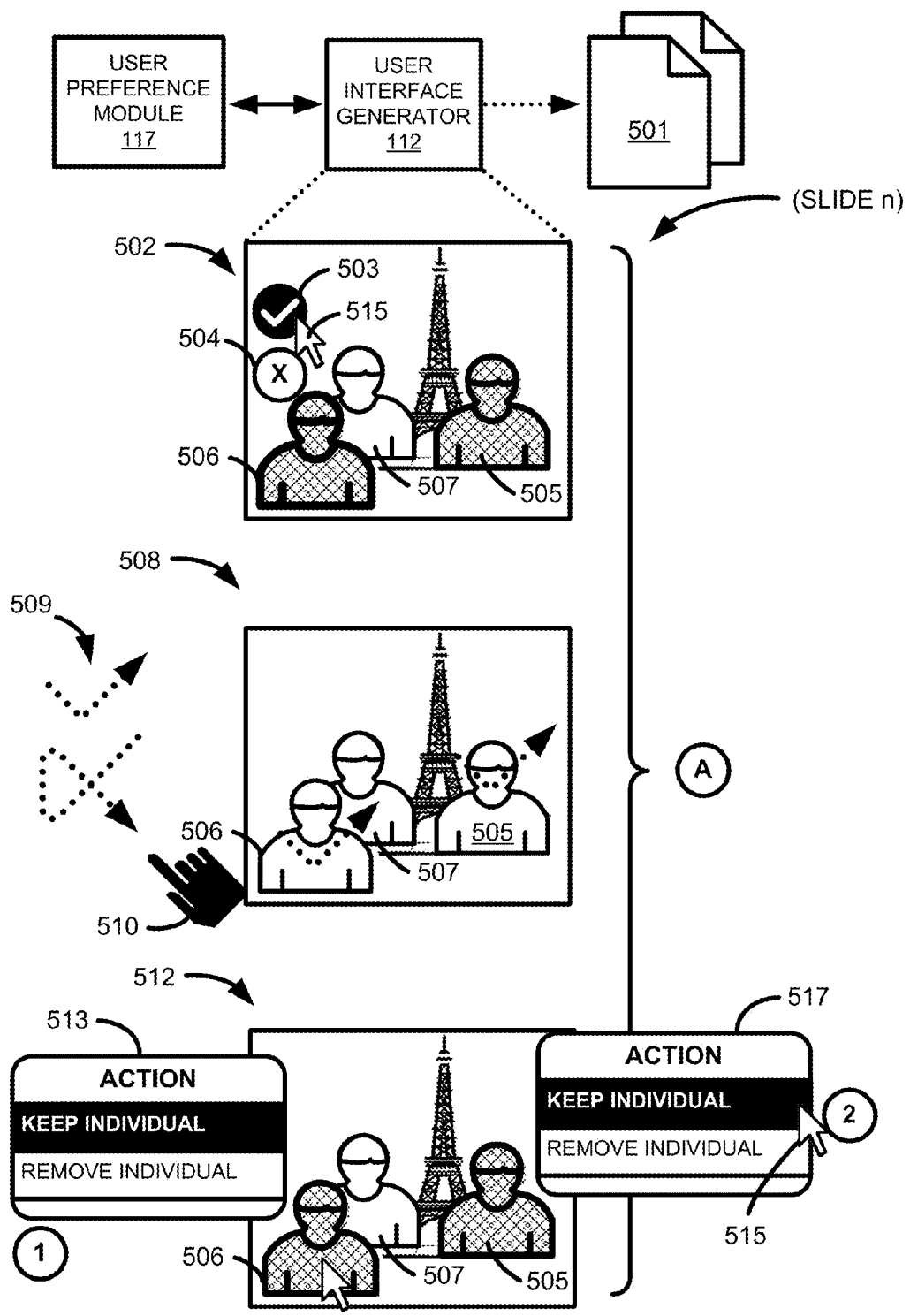
FIGS. 5A-B show various embodiments for selecting individuals to be included in a photo presentation using one or more controls.

FIGS. 5A-B, 6A-B, 7A-7B, 8A-B, and 9 illustrate various user interfaces for customizing a photo presentation such as a slideshow. With reference to FIG. 5A, shown are various embodiments for selecting individuals to be included in a slideshow presentation or other photo presentation using one or more controls. Specifically, FIG. 5A shows various implementations 502, 508, 512 are shown for allowing a user to use various controls to select one or more individuals to be added to a favorites list 501. As discussed earlier, a user begins viewing a slideshow, and while the slideshow is in progress, the user may invoke the one or more controls to customize the slideshow. The specified changes are then immediately incorporated into subsequent slides. For some implementations, a user can use an I/O device to invoke the one or more controls. This may comprise, for example, using a mouse 108 and performing a left-click, right-click, or other pre-defined mouse click(s). In some implementations, the user may also touch the display if a touch screen is incorporated as part of the media display system 102.

The first example user interface 502 allows a user to select an individual and to then select an action defined by icons or graphics 503, 504. The user preference module 117 operates in conjunction with the user interface generator 112 to identify selectable portions of the user interfaces 502, 508, 512. For example, the user preference module 117 identifies the faces of three individuals 505, 506, 507 that may be selected using the different means described below. For some implementations, the user interface generator 112 highlights selectable objects within the user interface 502, 508, 512. As a nonlimiting example, this may comprise superimposing a rectangular area around each of the detected facial regions of the individuals 505, 506, 507. As shown in FIG. 5A, two individuals 505, 506 have been selected and are thus highlighted. The button 503 with the "check" graphic signifies that the individual is to be part of the favorites list 501, whereas the "X" graphic signifies that the individual is to be part of a dislike list. An I/O device such as a mouse 108 may be used to move a mouse pointer 515 and click on the graphics 503, 504.

The second user interface 508 receives selections from a user accordingly to a predefined motion on the current slide or photo depicting individuals 505, 506, 507. For example, a check motion 509 signifies that the individual is to be part of the favorites list, whereas a continuous "X" motion signifies that an individual is to be part of a dislike list. As shown, the motions may be made by the user's finger 510 via a touch screen display. Alternatively, the motions may be made by moving a mouse pointer 515 using an I/O device such as the mouse 108 shown in FIG. 1.

The third user interface 512 provides context menus 513, 517 for including or excluding individuals. The context menus 513, 517 may be invoked by performing a mouse click on or near the selectable regions associated with the individuals 505, 506, 507. In the example shown, two individuals 505, 506 have been selected to be part of the favorites list 501. Note that for the various implementations described above, more than one individual may be selected such that multiple individuals from the same photo may be inserted into the favorites list 501 (or dislike list).

Figure 5B:
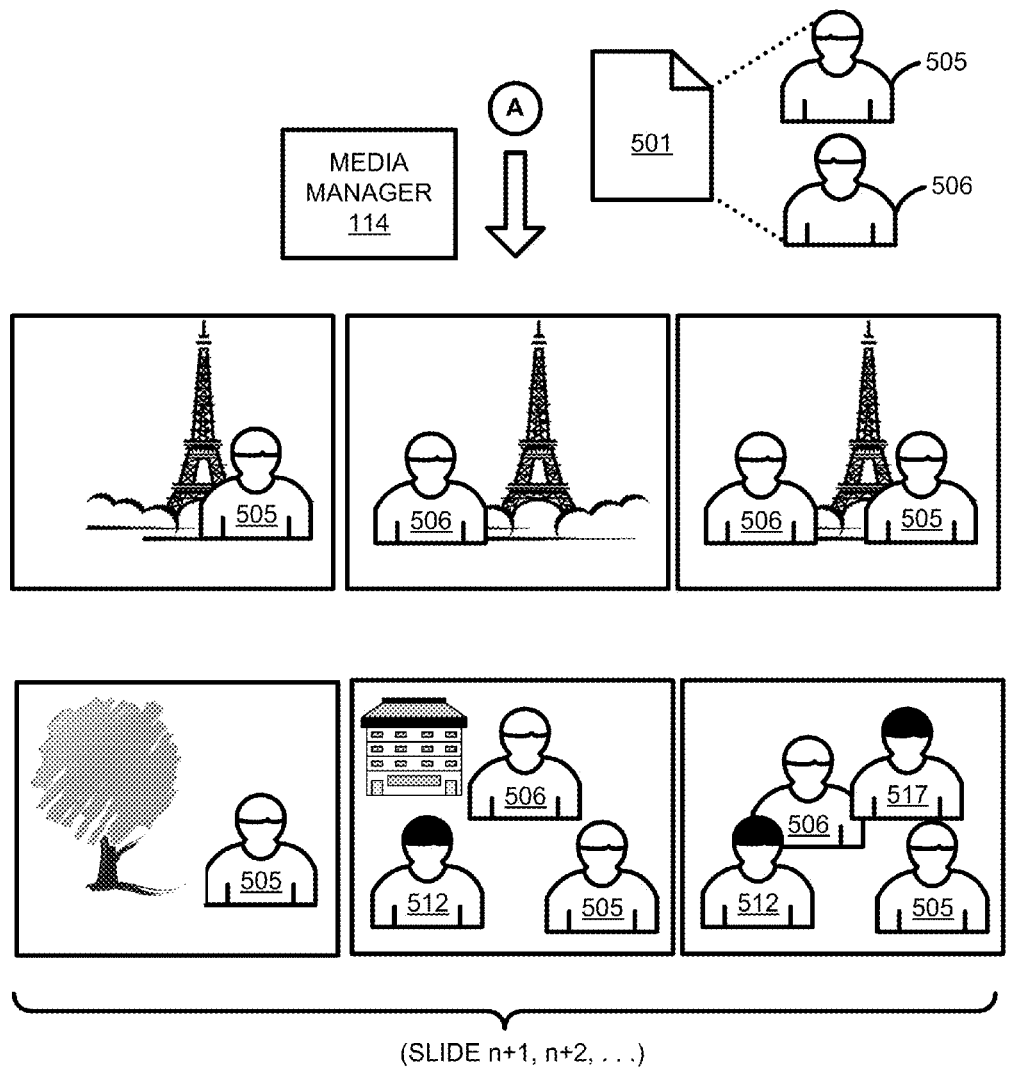

Referring to FIG. 5B, once individuals have been selected, the media manager 114 updates the slideshow or photo presentation according to the one or more selections made by the user and based on the action specified by the controls 503, 504, 509, 513, 517 in FIG. 5A. As shown in FIG. 5A, individuals 505, 506 are selected to be added to the favorites list 501. Based on the favorites list 501, the media manager 114 then sorts through all the digital images 115 to identify photos with the selected individuals 505, 506. Note, however, that the media manager 114 does not necessarily limit the search to photos bearing both individuals 505, 506 in the same photo. As shown in FIG. 5B, some of the photos in the slideshow include only the two selected individuals 505, 506 (either individually or together), but in some cases, other individuals 512, 517 may be included as well. In accordance with exemplary embodiments, the media manager 114 operates in real-time and updates the slideshow presentation according to the selections made. By way of illustration, if one of the example photos 502, 508, 512 shown in FIG. 5A corresponds to a current slide (n), then the changes are immediately incorporated into slide (n+1), (n+2), and so on. Note that the user can customize the slideshow at any time. For example, the user could customize the slideshow again at slide (n+1).

Figure 6A:
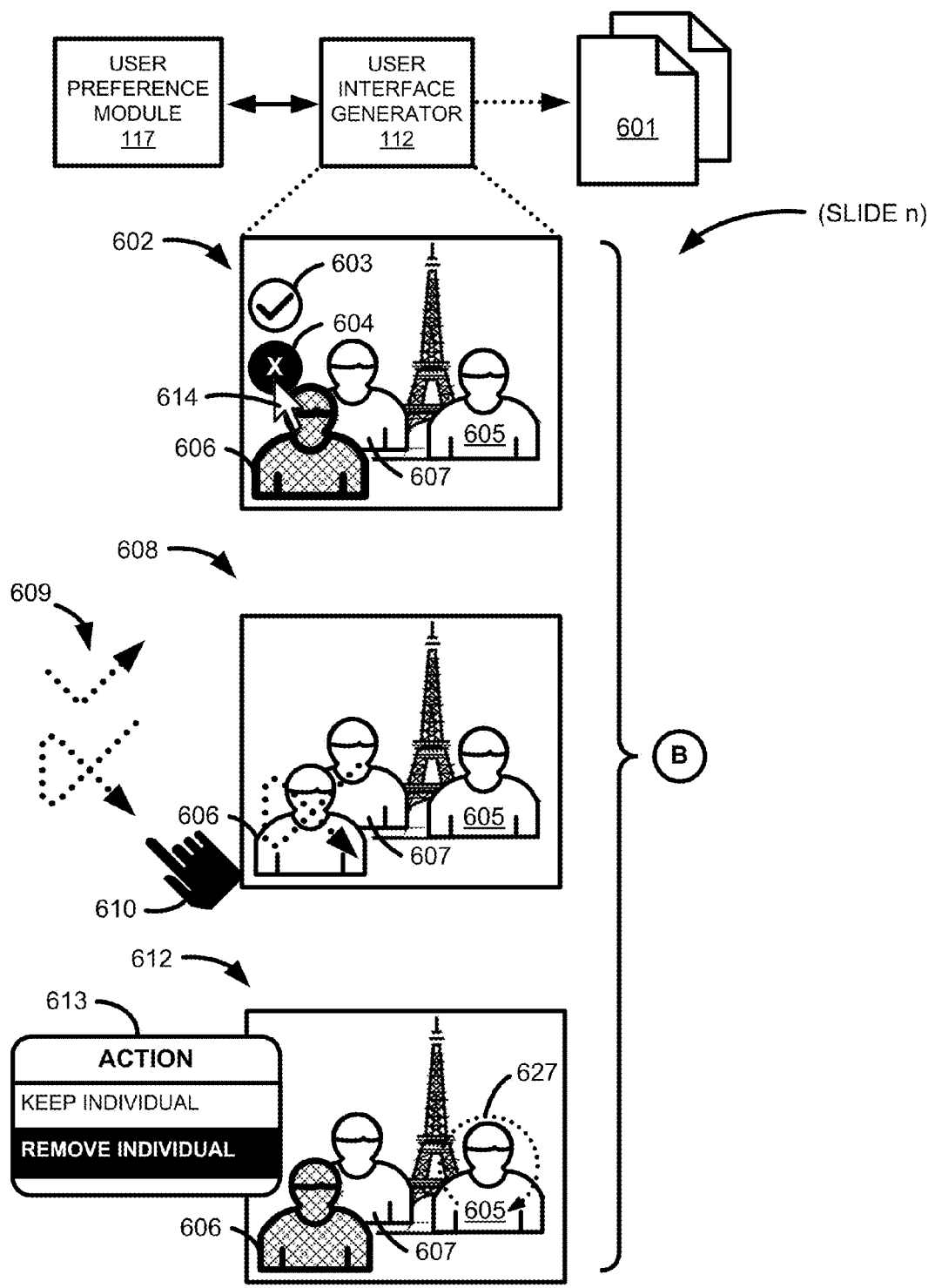
FIGS. 6A-B show various embodiments for selecting individuals to be excluded in a photo presentation using one or more controls.
Figure 6B:
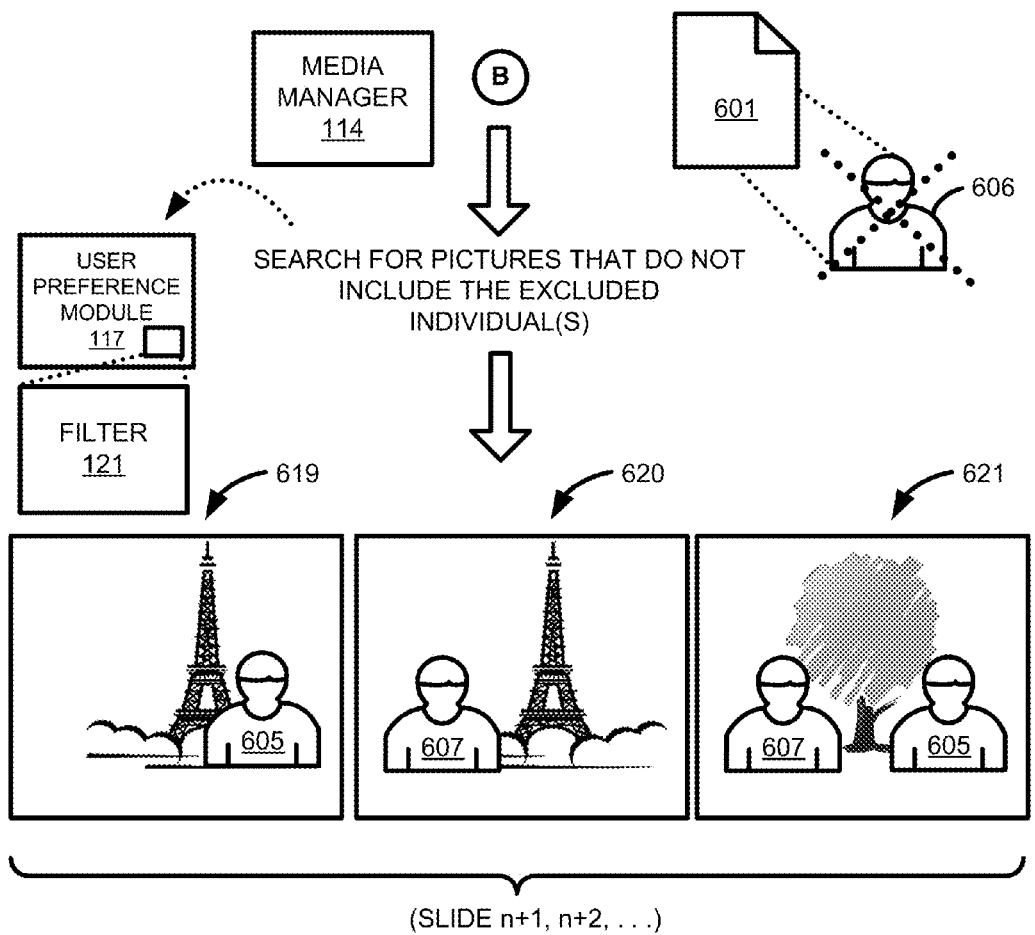

FIGS. 6A-B show various embodiments in which one or more individuals are added to a dislike list. As with the exemplary user interfaces in FIG. 5A, various controls 603, 604, 609, 613 are presented on the current side (i.e., slide (n)) that allow the user to specify an action to perform on the selected individual. Various user interfaces 602, 608, 612 are shown. For the first user interface 602, an I/O device such as a mouse 108 may be used to move a mouse pointer 614 and click on buttons 603, 604 to exclude one or more individuals by adding the one or more individuals to a dislike list 601. Note that in other embodiments, the selection of one or more individuals may be performed and then followed by the display of the buttons 603, 604. Namely, the "X" graphic button 604 is selected to exclude individual 606 from the slideshow. In the second user interface, an "X" motion 609 is made with the user's finger 610 (for touch screen implementations) or by moving the mouse pointer 614. Here, individual 606 has been selected to be added to the dislike list 601. In the third user interface 612, individual 606 is selected using a context menu 613 similar to the one discussed earlier in FIG. 5A. As an alternative means for selecting an individual to which the context menu 613 applies to, a circular motion 627 such as the one shown may be used to designate a particular individual. In the example shown, a circular motion 627 drawn around individual 605 would result in that individual 605 being selected. The action selected via the context menu 613 would then be applied to that individual 605.

Referring to FIG. 6B, the media manager 114 performs a search through the collection of images 115 based on the dislike list 601. In particular, a search is performed by the media manager 114 in conjunction with the user preference module 117 for photos that include the one or more individuals 606 in the dislike list 601. In particular, the filter 121 in the user preference module 117 is used to filter out pictures depicting the excluded individual(s) 606. Shown in FIG. 6B are various pictures (slides n+1, n+2, ...) 619, 620, 621 that do not depict the individual 606 specified in the dislike list 601. Note that the photos 619, 620, 621 in the slideshow may comprise any number of individuals 605, 607.

Figure 7A:
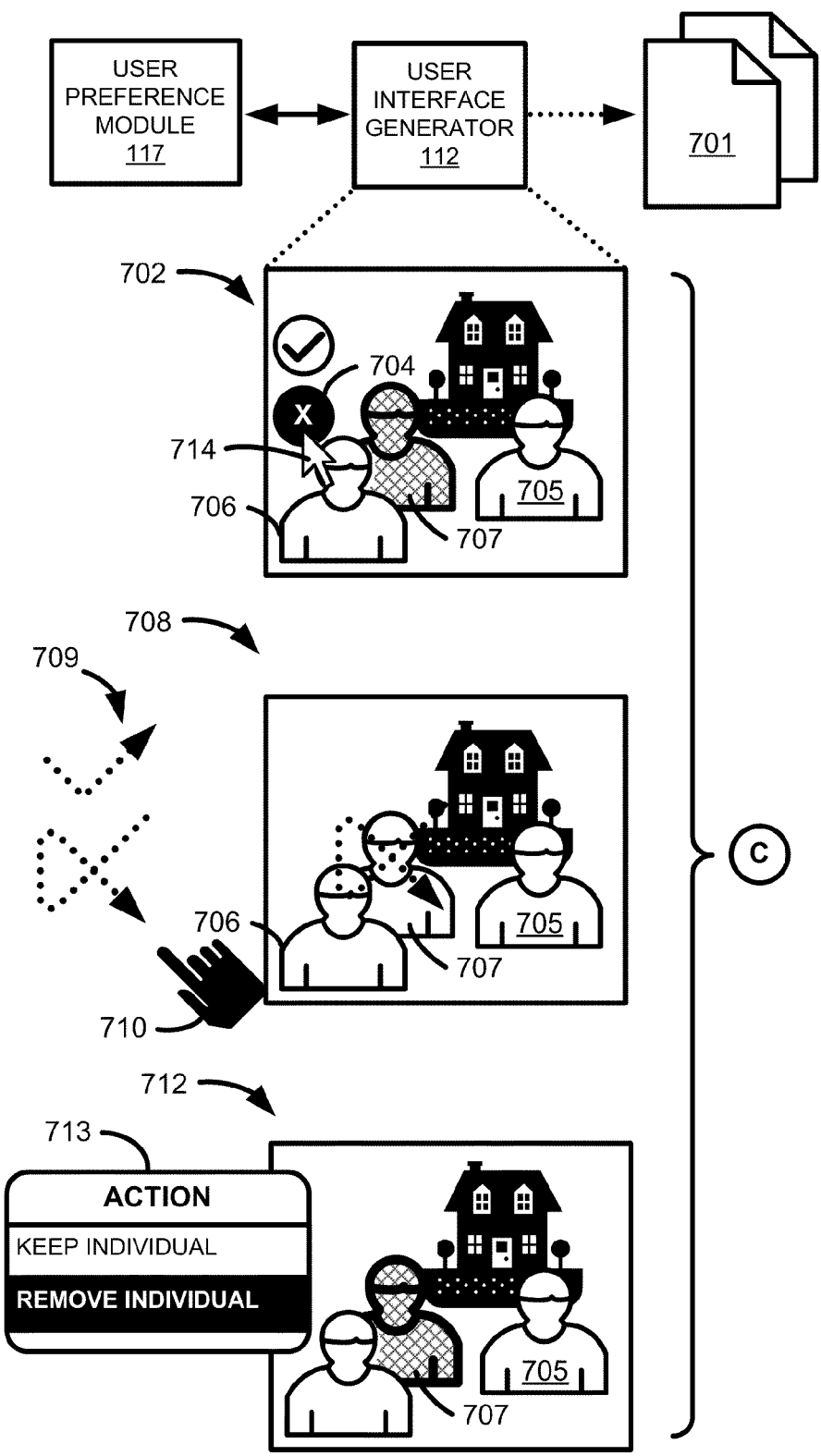
FIGS. 7A-B illustrate an embodiment in which post-processing is performed to exclude one or more individuals on a dislike list.
Figure 7B:
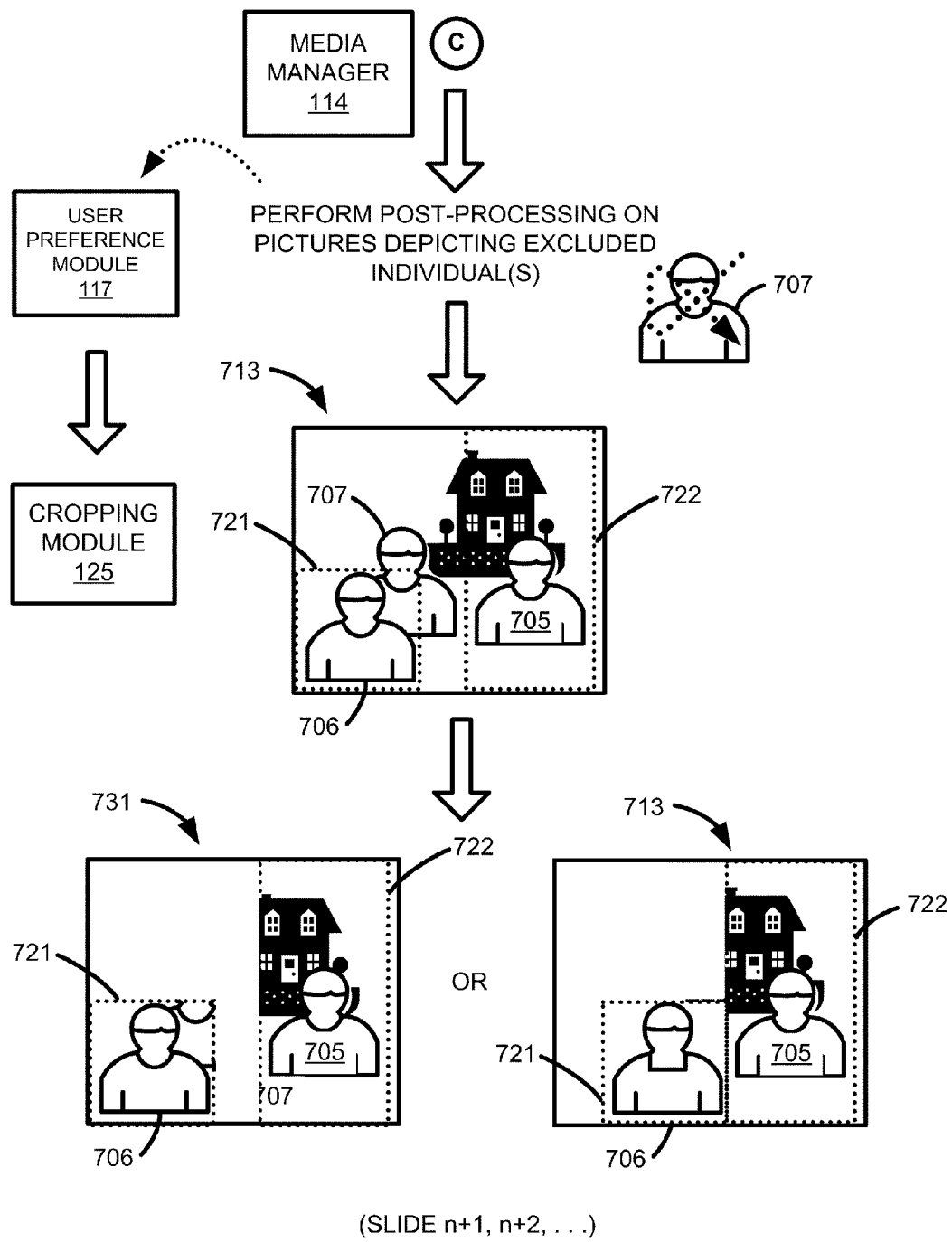

FIGS. 7A-B illustrate an embodiment in which post-processing is performed to exclude one or more individuals on a dislike list. FIG. 7A shows various user interfaces 702, 708, 712 similar to the ones shown in FIG. 6A for selecting an individual 707 to be included in a dislike list 701. The first user interface includes an "X" graphic button 704 being selected using a mouse pointer 714 controlled by a mouse 108. In the second user interface 708, an "X" pattern is drawn over an individual 707 with the user's finger 710 to exclude the individual 707 from the slideshow. Finally, the third user interface 712 illustrates a context menu 713 being applied to individual 707.

FIG. 7B shows an embodiment for post-processing photos to remove the selected individual 707 from photos. Based on the dislike list 701, the media manager 114 operates in conjunction with the user preference module 117 and the cropping module 125 to post-process photos as needed. Photos that do not include the excluded individual 707 do not need to undergo post-processing. For photos that do include the individual 707 to be excluded, the cropping module 125 defines rectangular areas 721, 722 around the remaining individuals 705, 706 such that the individual 707 to be excluded is removed from the photo, to the extent possible. The size of the rectangular areas 721, 722 may be defined based on the size of the facial regions of the individuals 705, 706. For some embodiments, the areas outside the cropped areas 721, 722 are removed, and for some embodiments, the cropped areas 721, 722 may be merged together, as shown in FIG. 7B.

Figure 8A:
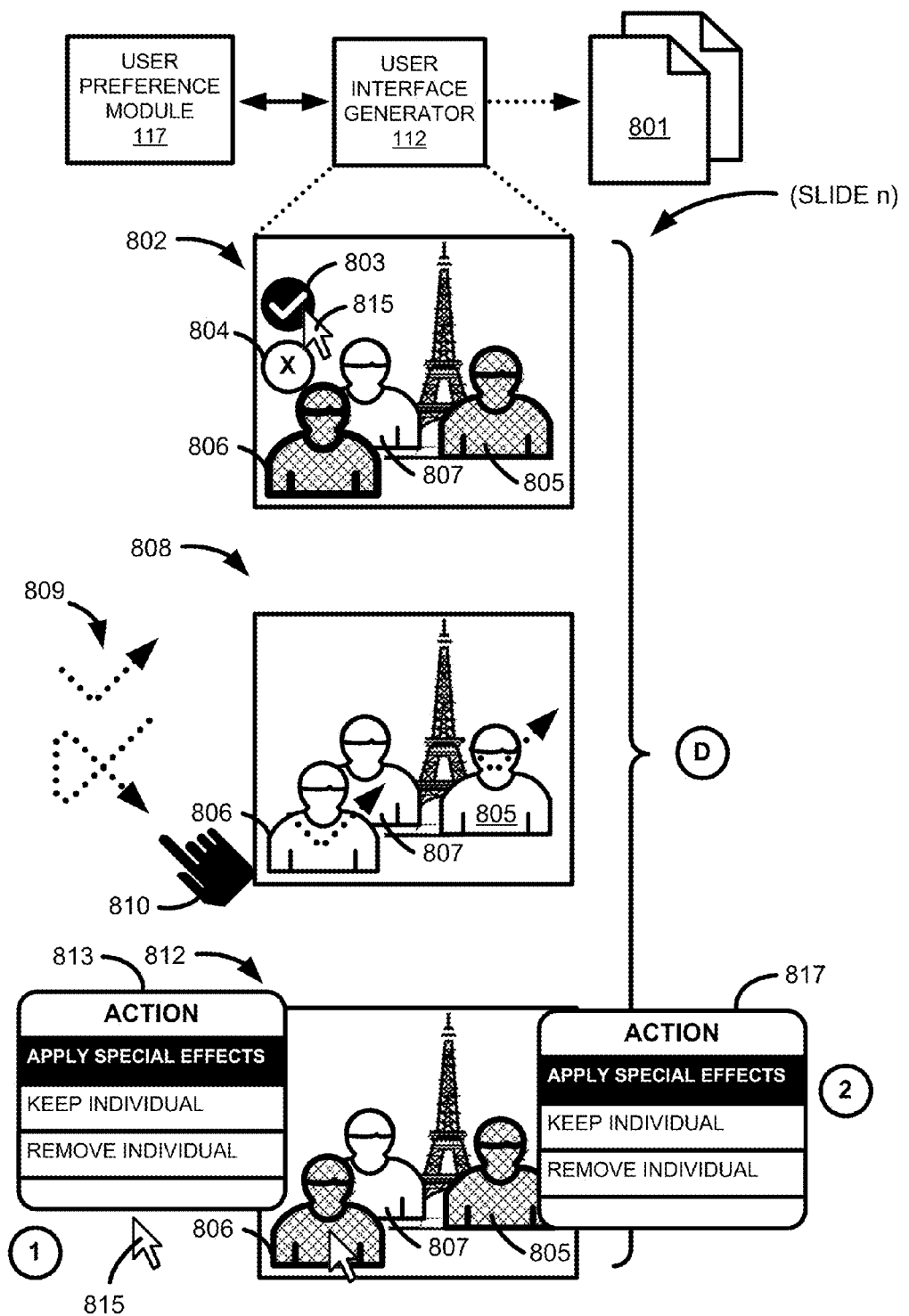
FIGS. 8A-B show an embodiment in which special effects are applied to one or more selected individuals.
Figure 8B:
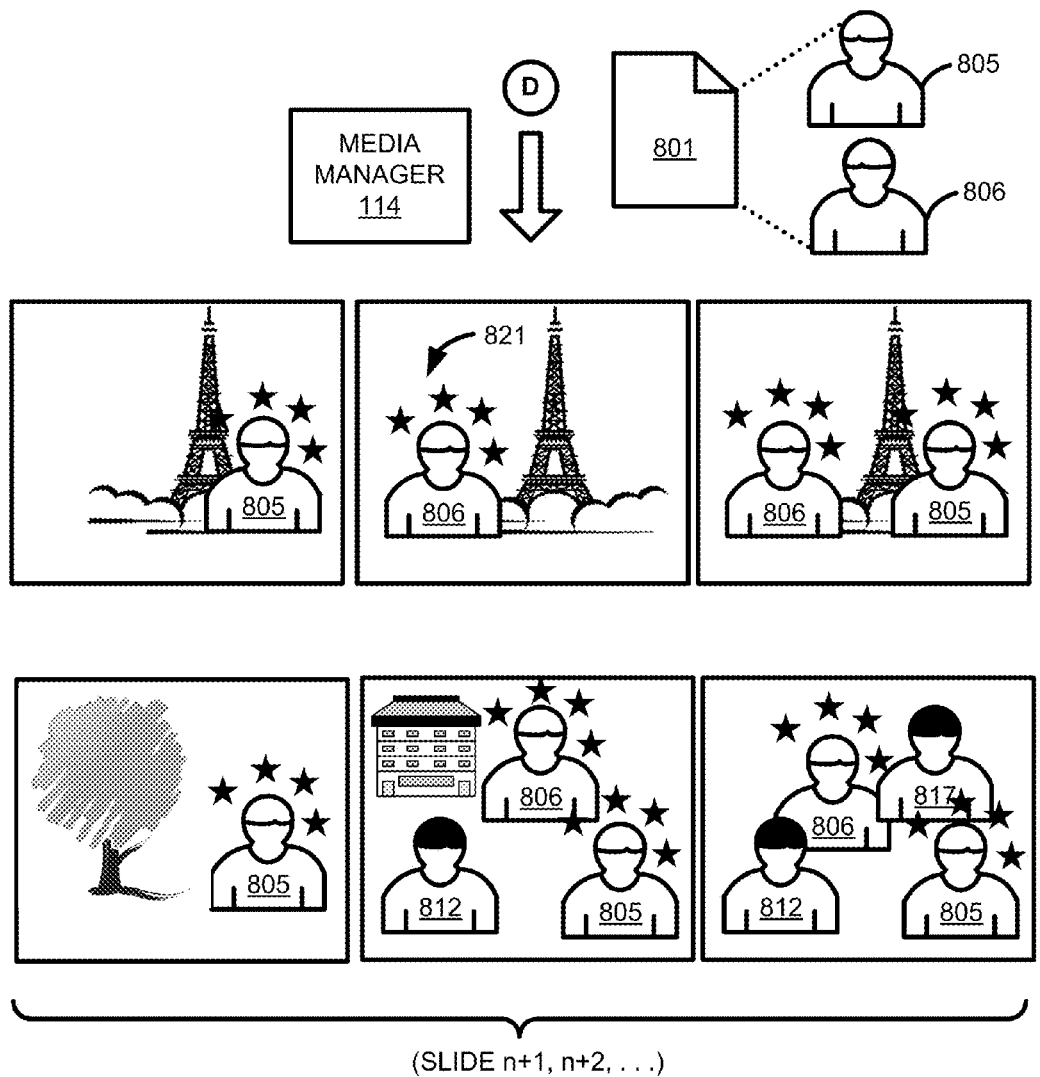

FIGS. 8A-B show an embodiment in which special effects are applied to one or more selected individuals. For some implementations, the user may select one or more individuals 805, 806, 807 using the various selection techniques described earlier for incorporating special effects. For example, in the first user interface 802, the user may utilize the graphic buttons 803, 804 using an I/O device such as a mouse 108 to make a selection by moving a mouse pointer 815. The second user interface 808 shows the use of a "check" pattern or an "X" pattern 809 for selecting individuals 805, 807 to be included in a special effects list 801. In the third user interface 812, context menus 813, 817 are shown, whereby a user can specify that special effects are to be applied.

Referring now to FIG. 8B, suppose star graphics 821 are selected as the special effect to be incorporated. The star graphic 821 is just one of many special effects that may be incorporated. It should note that other special effects may include by way of example and without limitation: moving graphics, customized text, customized subtitles, embedded video, embedded audio, and transition effects. A user may also decide to utilize predefined templates to be applied around a particular individual 805, 806, 807. Such templates may comprise "title" templates and "particle" templates. Title templates generally involve the insertion of a special frame in the display, where the special frame may coincide with a particular theme (e.g., birthday theme, wedding theme). Particle templates generally comprise predefined moving objects. Such templates may include, for example, falling snow flakes, a fire effect, or smoke effect. Other special effects include rotation of objects, blurred effects, color-modification, mosaics, zooming in and out of the facial regions of the one or more specified individuals, movement around the selected facial regions, distortion, intensity modification, background removal, background cropping, and the addition of images, video, audio, and/or text. As shown in slides (n+1), (n+2), and so on, the media manager 114 identifies photos bearing the two selected individuals 805, 806 and incorporates the star graphics 821 around the facial regions.

Figure 9A:
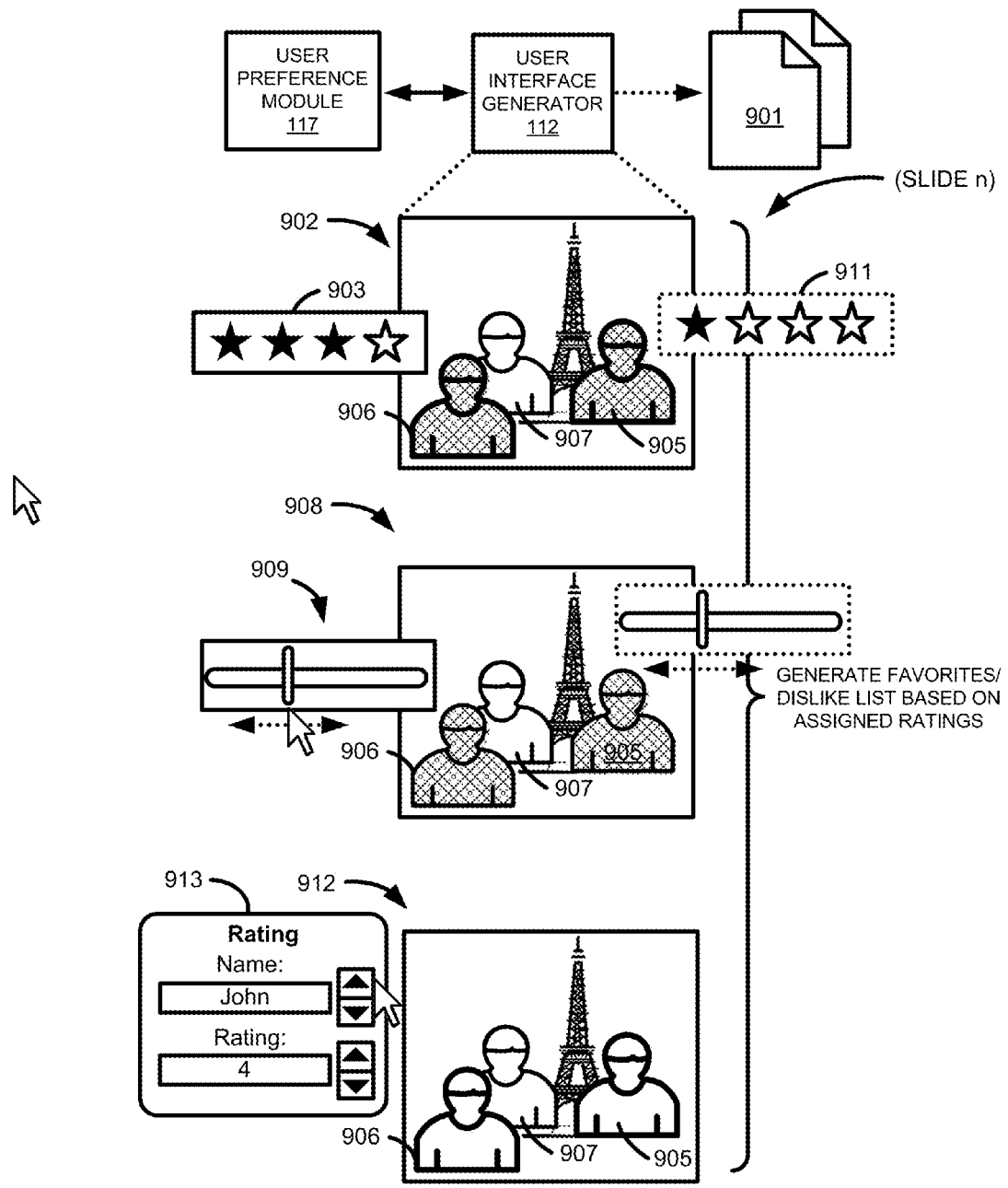
FIGS. 9A-B illustrate alternative embodiments for including or excluding individuals in a photo presentation.

FIG. 9A is an alternative embodiment whereby the favorites/dislike list is generated based on assigned ratings. As described earlier, user-defined preferences may be defined with respect to time, photo quality, and other criteria. For some embodiments, the user-defined preferences may comprise one or more ratings associated with particular individuals, objects, and so on. In accordance with such embodiments, the ratings may be specified by receiving user input via a graphics control panel, a slider control, a spinner control, or other controller. Based on the assigned rating assigned to each particular individual, the individual is either added to a favorites list or a dislike list. FIG. 9A shows various example user interfaces 902, 908, 912 whereby ratings are assigned to individuals within a particular photo. A user begins viewing a slideshow, and while the slideshow is in progress, the user may invoke the one or more controls to customize the slideshow. The specified changes are then immediately incorporated into subsequent slides. For some implementations, a user can use an I/O device to invoke the one or more controls. This may comprise, for example, using a mouse 108 and performing a left-click, right-click, or other pre-defined mouse click(s). In some implementations, the user may also touch the display if a touch screen is incorporated as part of the media display system 102.

The first example user interface 902 allows a user to select an individual and to then assign a particular using a graphics control panel 903. In the example shown, the user can assign between a 1-star to 4-star rating to the selected individual 906. Similarly, another graphics control panel 911 can be invoked to assign a second individual 905 a rating. As shown in the nonlimiting example, the first individual 906 is assigned a 3-star rating, while the second individual 905 is assigned a 1-star rating. For some implementations, a threshold is used to determine whether the individuals 906, 905 are assigned to a favorites list or to a dislike list 901. For example, different effect parameters may be utilized which include, but are not limited to, star size, slideshow presentation order, layout, and grouping based on the level of star rating. Note that the effect parameters can vary with the rating level. Referring back to FIG. 8B, for example, the star graphics 821 may be enlarged if an assigned rating is greater than three stars. As another example, the sparkling intensity of the star graphics 821 may be greater if the rating is greater than three stars. Similarly, the sparkling intensity may be lower if the rating is below a certain approval rating (e.g., two stars.) The playback sequence may also be based on the rating level.

The second user interface 908 shows a slider bar 909 used for assigning a rating to an individual 905, 906, 907. The third user interface 912 shows a spinner control 913, which allows a user to select from a range of values. For example, in some embodiments, facial analysis may be performed and based on available tag information, a list of individuals identified in the photo is generated and incorporated into the spinner control 913. Note that in other embodiments, the values in the spinner control 913 may be populated based on metadata associated with photos that have already been analyzed. A user can then make a selection from among the identified individuals 905, 906, 907 and assign a corresponding rating. In the example shown, John is assigned a rating of 4. As with the first user interface 902 described above, a threshold may be used to determine whether the individuals 905, 906, 907 are assigned to a favorites list or to a dislike list 901. As described for the other embodiments, the media manager 114 operates in real-time and updates the slideshow presentation according to the selections made. By way of illustration, if one of the example photos 902, 908, 912 shown in FIG. 9A corresponds to a current slide (n), then the changes are immediately incorporated into slide (n+1), (n+2), and so on. Note that the user can customize the slideshow at any time. For example, the user could customize the slideshow again at slide (n+1).

Figure 9B:
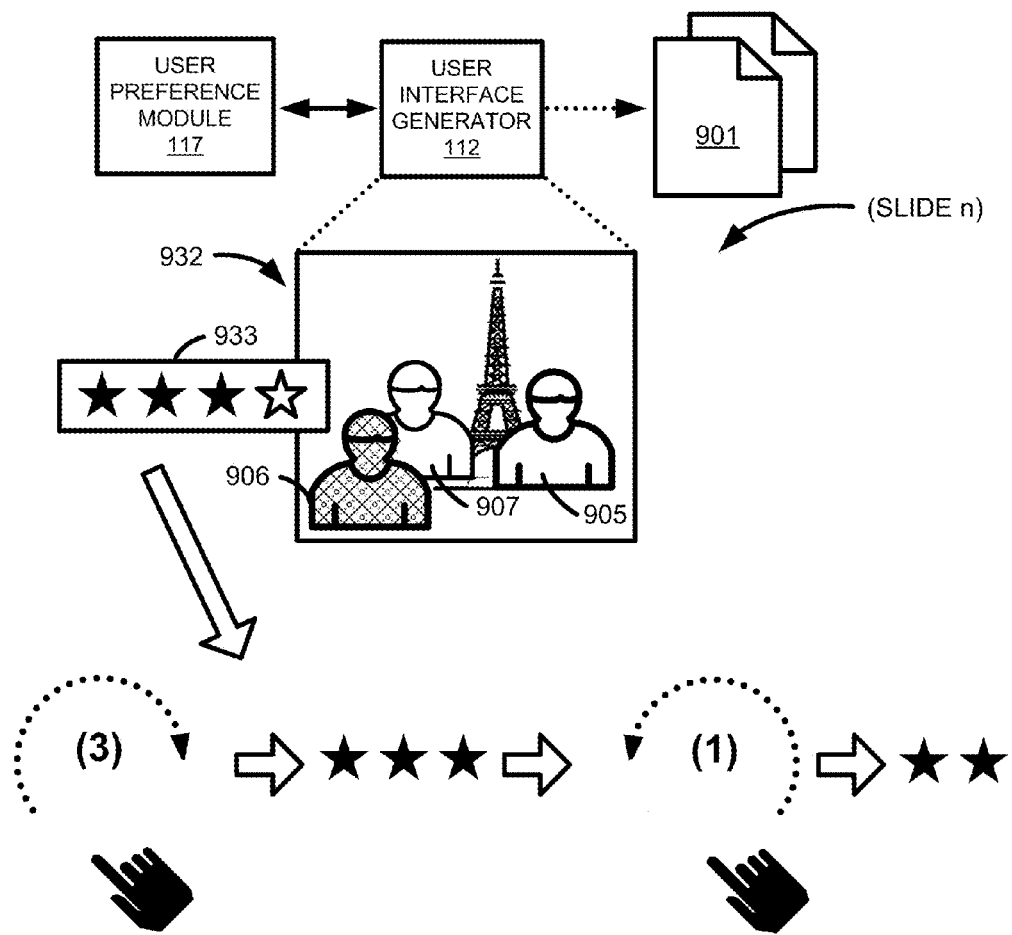

FIG. 9B illustrates an embodiment where one or more gestures may be used to assign a rating to individuals 905, 906, 907 in a current slide (n). For some embodiments, the user can assign ratings by performing clockwise or counter-clockwise rotations. FIG. 9B shows a user interface 932 whereby ratings are assigned to individuals within a particular photo through the use of gestures. A user begins viewing a slideshow, and while the slideshow is in progress, the user may invoke the one or more controls to customize the slideshow. The specified changes are then immediately incorporated into subsequent slides. For some implementations, a user can use an I/O device or a finger to invoke the one or more controls. For implementations of the media display system 102 that include a touch screen display, the user can perform clockwise or counter-clockwise rotations directly on the display using a finger. Alternatively, the user can use an I/O device such as a mouse 108 to perform the rotations. As illustrated in FIG. 9B, the user can assign ratings (e.g., star ratings) by performing a corresponding number of rotations. In particular, the number of rotations corresponds to the approval level of the individual 906. As illustrated, performing three clockwise rotations results in an approval rating of three stars, as reflected in the ratings panel 933 associated with the user 906. With the three-star rating as a starting point, for example, the user can perform a single counter-clockwise rotation to reduce the approval rating by one star, resulting in a two-star rating.

Figure 10:
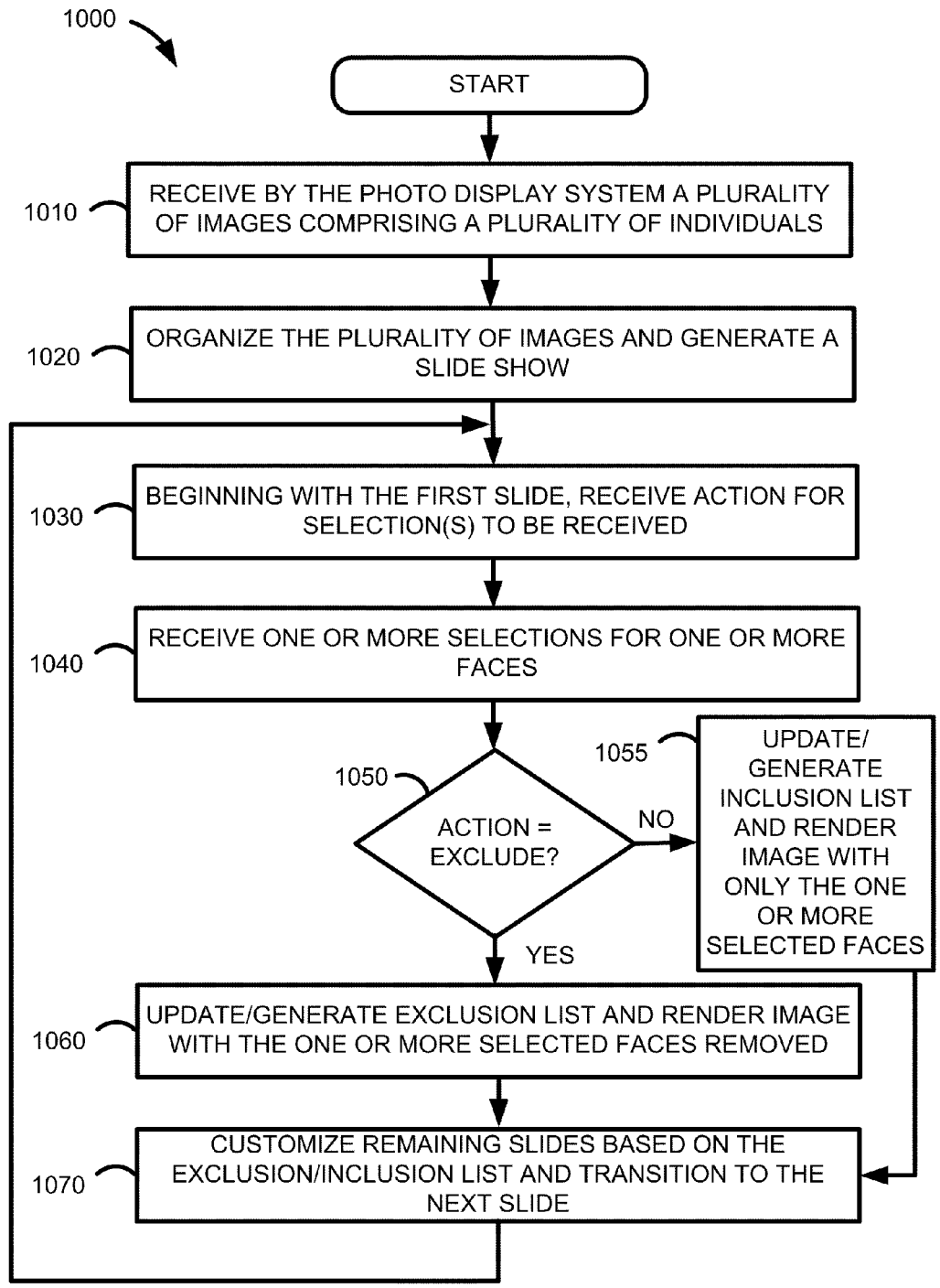
FIG. 10 is a flowchart of an alternative embodiment for customizing a photo presentation using the media display system of FIG. 1.

FIG. 10 is a flowchart 1000 of an alternative embodiment for customizing a photo presentation performed in the media display system 102 of FIG. 1. It should again be noted that if embodied in software, each block may represent a module, segment, or portion of code that comprises program instructions to implement the specified logical function(s). The program instructions may be embodied in the form of source code that comprises statements written in a programming language or machine code that comprises numerical instructions recognizable by a suitable execution system such as a processor in a computer system or other system such as the ones shown in FIG. 1. The machine code may be converted from the source code, etc. If embodied in hardware, each block may represent a circuit or a number of interconnected circuits to implement the specified logical function(s).

Referring to FIG. 10, block 1010 begins by receiving a plurality of images that comprise individuals. In block 1020, the images are organized and a slideshow is generated. In block 1030, an action is received for the first or current slide. The action will later be applied to the remaining slides. In block 1040, selections of one or more faces in the images are received, and a determination is made on whether the received action corresponds to excluding images (decision block 1050). If the received action does not correspond to excluding images, in block 1055 a favorites list is generated or updated, and the slideshow is updated such that it only comprises the one more faces specified in the favorites list. Referring back to decision block 1050, if the received action corresponds to excluding images, then in block 1060, a dislike list is generated or updated and the slideshow is updated such that slides with the selections specified in the dislike list are excluded. In block 1070, the remaining slides are customized according to the exclusion/favorites list, and the next slide is shown, whereby the user can then customize the slideshow yet again. Again, as one of ordinary skill in the art will appreciate, other sequences of steps may be possible, and the particular order of steps set forth above should not be construed as limitations on the claims.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A media display system for customizing a slideshow comprising a plurality of images depicting individuals, comprising:
    at least one computing device;
    a media manager executable in the at least one computing device, the media manager configured to receive the plurality of images;
    a media editor executable in the at least one computing device, the media editor configured to analyze the plurality of images, wherein the media editor comprises:
        a user preference module for analyzing facial regions in the plurality of images;
        a user interface generator executable in the at least one computing device, the user interface generator for displaying the slideshow and receiving a pre-defined pattern drawn on at least one of the depicted individuals in a current image of the slideshow for specifying an action and for selecting one or more individuals in the current image;
        wherein the media editor is configured to generate an action list according to the specified action and the selection of one or more individuals, wherein the media manager is further configured to dynamically customize the slideshow according to the action list during playback of the slideshow, wherein customizing the slideshow comprises applying the specified action to images subsequent to the current image, wherein the specified action comprises one of: including only images comprising at least one of the one or more specified individuals during playback of the slideshow; and excluding only images comprising at least one of the one or more specified individuals during playback of the slideshow.

2. The system of claim 1, wherein the media manager customizes the slideshow according to the action list by sorting the plurality of images based on one or more of: picture quality, sharpness, whether individuals in the images are smiling, time information, confidence levels relating to facial matches, and geotagging.

3. The system of claim 1, wherein the specified action comprises applying special effects to images comprising the one or more specified individuals.

4. The system of claim 3, wherein applying special effects comprises applying special effects in or around facial regions of the one or more specified individuals.

5. The system of claim 4, wherein the special effects comprise one or more of: zooming in and out of the facial regions of the one or more specified individuals, movement around the selected facial regions, color modification, distortion, intensity modification, background removal, background cropping, and the addition of images, video, audio, and/or text.

6. The system of claim 1, wherein the user interface generator is further configured to display one or more controls for specifying an action, wherein the one or more controls comprises one of:
- selectable graphics buttons, wherein each graphic button corresponds to an action; and
- context menus with selectable actions.

7. The system of claim 1, wherein the media editor further comprises a post-processing module configured to crop photos including one or more individuals to be selected in order to exclude images of one or more specified individuals from the plurality of images.

8. The system of claim 7, wherein the post-processing module is further configured to zoom in and out of the facial regions.

9. A computer-readable medium storing a program for execution on a processor, the program comprising computer executable instructions configured to perform the steps of:
- receiving a photo presentation comprising a plurality of slides depicting individuals for a slideshow;
- initiating playback of the slideshow;
- during playback, generating a user interface comprising a current slide of the slideshow;
- receiving a selection of one or more individuals and an action via a pre-defined pattern drawn on at least one of the depicted individuals;
- generating an action list according to the selection and the specified action;
- analyzing facial regions of the individuals in the plurality of the slides;
- based on the analyzed facial regions, performing the specified action to the plurality of slides to obtain a subset of slides, wherein the specified action comprises one of: including only one or more specified individuals during playback of the slideshow; and excluding only the one or more specified individuals during playback of the slideshow; and
- beginning with the next slide in the slideshow, continuing playback of the slideshow based on the subset of slides.

10. The computer-readable medium of claim 9, wherein the user interface further comprises controls, wherein the controls comprises at least one of:
- selectable graphics buttons corresponding to multiple actions; and
- context menus specifying multiple actions.

11. The computer-readable medium of claim 9, wherein the specified action comprises applying special effects to facial regions around the selected individuals.

12. The computer-readable medium of claim 9, wherein the executable instructions are further configured to perform the step of:
- cropping slides to exclude one or more specified individuals from the plurality of slides to generate at least one cropped area for each slide.

13. A method performed for customizing a slideshow, comprising:
- receiving, by a computing device, the slideshow comprising a plurality of photos depicting individuals;
- initiating playback of the slideshow;
- during playback of the slideshow, receiving, by the computing device, a pre-defined pattern drawn on at least one of the depicted individuals for selecting and specifying an action to one or more selected individuals on a current photo of the slideshow;
- analyzing, by the computing device, facial regions of the individuals in the plurality of the slides; and
- customizing, by the computing device, the slideshow according to the specified action and according to the analyzed facial regions during playback of the slideshow, wherein customizing the slideshow comprises applying the action list to photos subsequent to the current photo, wherein the specified action comprises one of: including, by the computing device, only photos comprising at least one of the one or more specified individuals during playback of the slideshow; and excluding, by the computing device, only photos comprising at least one of the one or more specified individuals during playback of slideshow.

14. The method of claim 13, wherein receiving a selection of one or more individuals comprises:
- generating, by the computing device, a user interface with one or more selection controls;
- receiving, by the computing device, one or more selections of individuals; and
- receiving, by the computing device, through the one or more action controls an action to be applied in generating the slideshow.

15. The method of claim 14, wherein the one or more controls comprises one of:
- selectable graphics buttons, wherein each graphic button is used to specify an action;
- context menus for specifying an action; and
- pre-defined patterns drawn over one or more individuals, wherein each pre-defined pattern corresponds to an action.

16. The method of claim 15, wherein customizing the slideshow comprises performing the specified action to photos of individuals specified in the action list.

17. The method of claim 16, wherein the specified action comprises applying, by the computing device, special effects to photos comprising the one or more selected individuals.

18. The method of claim 17, wherein applying special effects comprises applying, by the computing device, special effects around facial regions of the one or more selected individuals.

19. The computer-readable medium of claim 12, wherein the executable instructions are further configured to perform the step of:
- for each slide, merging the at least one cropped area.

* * * * *